Dec. 19, 1961 W. HOFFMANN Re. 25,099

CENTRIFUGAL APPARATUS FOR SEPARATING SOLIDS

Original Filed Nov. 15, 1955

INVENTOR
WALTER HOFFMANN
By Rudolph G. Hanz
ATTORNEY

United States Patent Office

Re. 25,099
Reissued Dec. 19, 1961

25,099
CENTRIFUGAL APPARATUS FOR SEPARATING SOLIDS

Walter Hoffmann, Lidingo, Sweden, assignor to Projecting AB, Stockholm, Sweden

Original No. 2,956,679, dated Oct. 18, 1960, Ser. No. 546,923, Nov. 15, 1955. Application for reissue Aug. 31, 1961, Ser. No. 136,980
Claims priority, application Sweden Nov. 17, 1954
2 Claims. (Cl. 209—144)

Matter enclosed in heavy brackets [ ] appears in the original patent but forms no part of this reissue specification; matter printed in italics indicates the additions made by reissue.

This invention relates to cyclones for separating or fractionating dispersions, for example solids in gases or in liquids, such as coal water suspensions or cellulose pulp suspensions. Such cyclones consist of a conical chamber of circular transverse cross section, into which chamber the dispersion is introduced tangentially into the larger portion thereby creating a whirling motion within the chamber, giving rise to a vortex, causing the coarser particles to be thrown outwardly by the centrifugal force and to leave the chamber through the apex of the cone. The finer particles depart through a centrally arranged outlet, the so-called overflow pipe.

The invention relates to such an apparatus for separating dispersions in conical chambers of circular cross section, which are provided with outlets adjacent each end and with one or more inlets for the dispersion adjacent the larger portion of the conical chamber, and the invention is characterized in that a plurality of such conical chambers are arranged radially in approximately the same plane, the apices of the chambers being turned towards each other. The chambers may preferably be enclosed in a casing which at the same time constitutes a supplying chamber for the dispersion in such a manner that the conical chambers are surrounded by the dispersion supplied. The supplying chamber is preferably circular, its axis being at least approximately at right angles to the axes of the chambers. It is also possible to combine a plurality of groups of radially arranged conical chambers having a common axis for each group.

By chambers arranged radially in approximately the same plane is meant that the central lines of two opposite chambers form an angle with each other, lying between 180°, and 180° reduced by the cone angle. If this angle were made more acute, there would be less possibility of placing more groups of chambers above each other whereby the gain of space would be lost correspondingly.

Figure 1:
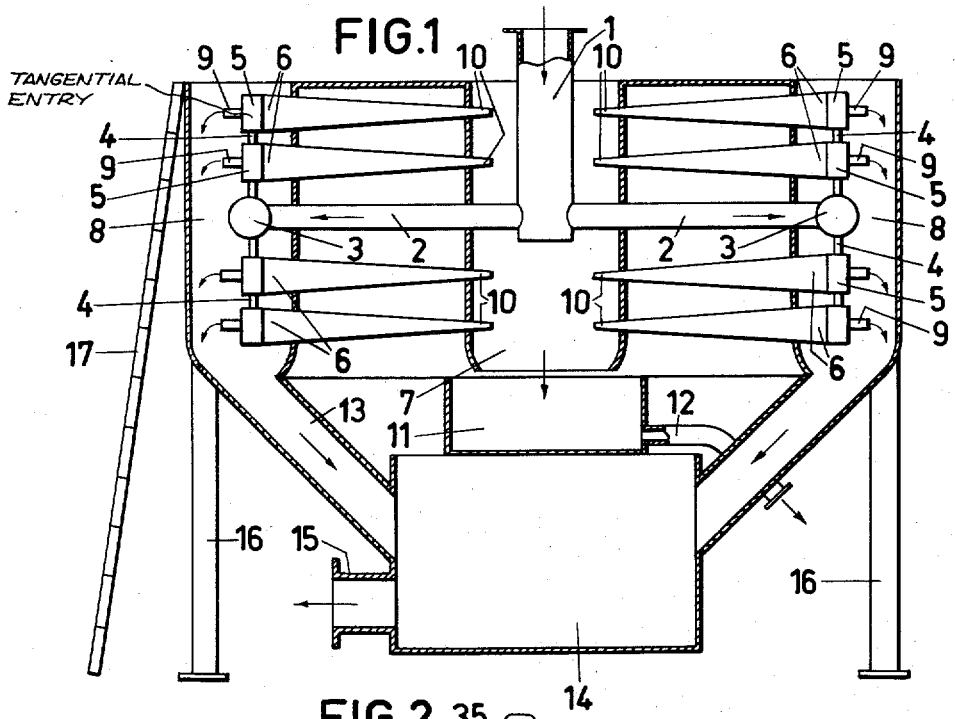
Figure 2:
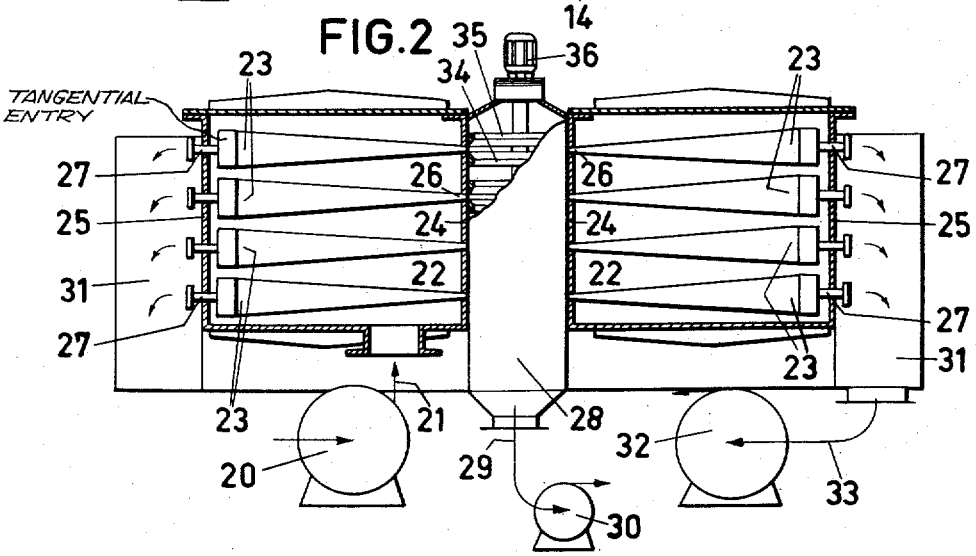

The invention is illustrated in the accompanying drawing in which FIG. 1 is a vertical section through an embodiment of the apparatus and FIG. 2 is a vertical section through another embodiment.

Both these embodiments are intended for the treatment of cellulose pulp suspensions.

In the embodiment shown in FIG. 1 the pulp suspension is supplied through a conduit 1 provided with radial pipe conduits 2 projecting therefrom which open into a circular conduit 3. From the latter, conduits 4 project, which are tangentially connected to the cylindrical part 5 of a great number of radially disposed hydraulic cyclones 6, the apices of which are turned towards each other. In the embodiment shown in the drawing four groups of such hydraulic cyclones are placed above each other. The apices of the cylones open into a chamber 7 provided in the central portion of the apparatus, said chamber 7 being screened-off from the hydraulic cyclones. The overflow pipes 9 of the hydraulic cyclones open into an annular chamber 8 which also is screened-off from the cyclones.

The pulp suspension is supplied through the conduit 1 and passes through the conduits 2 out into the circular conduit 3 and from there through the connecting conduits 4 to the cylindrical part of the hydraulic cyclones 6, the suspension being divided into two fractions, one departing through the overflow pipes 9 and the other departing through the openings 10 of the apices of the cyclones. The coarser fraction (reject), which departs through the openings 10 of the apices, passes through the central chamber 7 to a trough 11 from which it is drawn off through a pipe conduit 12. The fraction departing through the overflow pipes 9 passes through the conduit 13 to a collecting vessel 14 from which it is withdrawn through a pipe conduit 15. The device is carried by foundations 16 and is available for inspection and repair by way of a stair 17.

By placing the hydraulic cyclones radially a very great number of cyclones can be placed in a comparatively small space.

In the embodiment shown in FIG. 2 the suspension is supplied by means of a pump 20 and a conduit 21 to an annular chamber 22. In this chamber 22 hydraulic cyclones 23 are radially applied, the apices being turned towards each other. Four groups of cyclones arranged in such a way are applied in the chamber. The cyclones have, apart from the overflow pipes, somewhat smaller length than the distance between the inner vertical wall 24 and the outer vertical wall 25 of the chamber 22. When assembled, the apices 26 of the cylones are applied in a recess intended therefor in the wall 24 and thereafter the overflow pipes 27 of the cyclones are introduced into openings in the wall 25 and into the hydraulic cyclones. Thus, the assemblage is very simple. In the embodiment shown in the drawing the hydraulic cyclones are enclosed in the chamber 22. The apices 26 of the cyclones open into a central chamber 28 which leads to an outlet via a conduit 29 and a pump 30. The overflow pipes 27 open into an annular chamber 31 which communicates with a pump 32 via a conduit 33.

In front of the apices of the cyclones there are applied circumferentially spaced circular knife members 34, 35 by means of which the size of the effective openings of the apices can be controlled. These knife members can be rotated by means of a motor 36.

The pulp suspension is supplied through the conduit 21 into the chamber 22 from where it is introduced tangentially into the larger portion of the hydraulic cyclone. By the whirling motion the suspension is divided into two fractions, of which the one departing through the apices is drawn off through the chamber 28 and the pump 30, and the one departing through the overflow pipes 27 through the chamber 31 and the pump 32.

Through this invention it is possible to manufacture a whole group of hydraulic cyclones in one single block, for example by moulding a plastic material, such as rubber. It is also possible to arrange the groups of cyclones in such a way that the fraction departing through the overflow pipes of a group of cyclones is introduced into the larger portion of an adjacent group of cyclones and that the fraction departing from the overflow pipes of the latter group of cyclones in its turn is introduced into the larger portion of the next group of cyclones, i.e. so that the groups of cyclones are connected in series.

Having now described my invention, what I claim as new and desire to secure by Letters Patent is:

*1.* Apparatus for separating dispersions from a fluid comprising, in combination, several banks of generally conically tapered cyclones each open at both opposite ends, the cyclones in each bank being radially disposed in a substantially common plane, the open narrow ends of said cyclones facing radially inwardly toward each other, all of said banks being stacked about a substantially common center axis, a common center discharge duct coaxial with said axis communicating with the narrow ends of said cyclones in all said banks, a second common annular discharge duct encompassing the wide bottom ends of said cyclones in all the planes, said second duct being disposed coaxially with said axis, a casing disposed coaxially with said ducts, said casing housing said banks of cyclones and constituting a supply container for said fluid, the wide end of each of said cyclones being radially spaced from the peripheral casing wall to admit fluid from the container simultaneously into all of said cyclones, said central duct with said annular duct and said casing being in the form of generally cylindrical coaxially disposed housings, and the cylindrical wall of said casing being situated intermediate the walls of said ducts.

*2. Apparatus for separating dispersions from a fluid comprising, in combination, several banks of generally conically tapered cyclones each open at both opposite ends, the cyclones in each bank being radially disposed in a substantially common plane, the open narrow ends of said cyclones facing radially inwardly toward each other, all of said banks being stacked about a substantially common center axis, a common center discharge duct coaxial with said axis communicating with the narrow ends of said cyclones in all said banks, a second common annular discharge duct encompassing the wide bottom ends of said cyclones in all the planes, said second duct being disposed coaxially with said axis, a casing disposed coaxially with said ducts, said casing housing said banks of cyclones and constituting a supply container for said fluid to admit fluid from the container simultaneously into all of said cyclones tangentially at the larger portions thereof, said central duct with said annular duct and said casing being in the form of generally cylindrical coaxially disposed housings, and the cylindrical wall of said casing being situated intermediate the walls of said ducts.*

References Cited in the file of this patent
or the original patent

UNITED STATES PATENTS

| | | |
|---|---|---|
| 2,643,737 | Bowers | June 30, 1953 |
| 2,671,560 | Fontein | Mar. 9, 1954 |
| 2,734,630 | Vander Wal | Feb. 14, 1956 |